United States Patent [19]

Ueda et al.

[11] Patent Number: 5,119,438
[45] Date of Patent: Jun. 2, 1992

[54] RECOGNIZING APPARATUS

[75] Inventors: Toru Ueda, Nara; Yasushi Ishizuka, Yamatokoriyama; Fumio Togawa, Nara, all of Japan

[73] Assignee: Sharp Kabushiki Kaisha, Osaka, Japan

[21] Appl. No.: 491,039

[22] Filed: Mar. 9, 1990

[30] Foreign Application Priority Data

Mar. 13, 1989 [JP] Japan ................................. 1-60328

[51] Int. Cl.$^5$ .............................................. G06K 9/62
[52] U.S. Cl. ...................................... 382/14; 382/36; 382/37; 364/916
[58] Field of Search ...................... 382/14, 15, 30, 36, 382/37, 38; 364/513, 916, 916.4

[56] References Cited

U.S. PATENT DOCUMENTS

| 4,400,828 | 8/1983 | Pirz et al. | 382/30 |
| 4,467,437 | 8/1984 | Tsuruta et al. | 382/30 |
| 4,760,604 | 7/1988 | Cooper et al. | 382/15 |
| 4,805,225 | 2/1989 | Clark | 382/15 |
| 4,876,731 | 10/1989 | Loris et al. | 382/15 |
| 4,905,162 | 2/1990 | Hartzband et al. | 382/30 |
| 4,965,725 | 10/1990 | Rutenberg | 382/36 |

OTHER PUBLICATIONS

T. Kohonen. "An Introduction to Neural Computing". Neural Networks, vol. 1 pp. 8-16, 1988.

Primary Examiner—David K. Moore
Assistant Examiner—Yon Jung

[57] ABSTRACT

A recognizing apparatus is provided for recognizing a class to which an inputted characteristic pattern belongs from among a plurality of classes to be discriminated using a neural network. The classes are classified into a plurality of categories. The apparatus includes a network selecting portion for selecting a category to which the inputted characteristic pattern belongs and for selecting a neural network for use in discriminating the class to which the inputted characteristic pattern belongs in the selected category. The apparatus further includes a network memory portion, a network setting portion and a details discriminating portion. The network memory portion stores structures of a plurality of neural networks which have finished learning for respective categories, weights of the neural networks set by the learning and a plurality of discriminating algorithms to be used when the classes are discriminated by the neural networks. The network setting portion sets the structure and weights of a neural network selected by the network selecting portion and a discriminating alogrithm appropriate to the selected category. The details discriminating portion recognizes the class to which the inputted characteristic pattern belongs by performing the details discriminating operation using the neural network set by the neural network setting portion.

6 Claims, 3 Drawing Sheets

Fig. 4
(a) INPUT CHARACTER   「あ」   「ば」

Fig. 4
(b) SELECTED CATEGORY

| 1 | 2 |
|---|---|
| 「あ」 | 「は」 |
| 「お」 | 「ば」 |
| 「ち」 | 「ぱ」 |

Fig. 4
(c) SELECTED ALGORITHM   L V Q 2   BACKPROPAGATION

Fig. 4
(d) NETWORK USED   KOHONEN TYPE   PERCEPTRON TYPE

Fig. 4
(e) RECOGNITION RESULT   「あ」   「ば」

RECOGNIZING APPARATUS

BACKGROUND OF THE INVENTION

1. Field of the Invention

The present invention generally relates to a recognizing apparatus for recognizing a class to which an inputted characteristic pattern belongs, and more particularly, to a recognizing apparatus for recognizing the class from among a plurality of classes to be discriminated by using a neural network appropriate to a category to which the class belongs.

2. Description of the Prior Art

In some of the conventional recognizing apparatus, classes to which objects to be discriminated belong are not classified into categories. A class containing inputted data is generally selected from among all the classes.

In other recognition apparatus, all the classes are initially classified into categories. In this case, inputted data is compared with each of several reference patterns contained in each category so that a category to which the inputted data belongs may be discriminated from among all the categories. The class containing the inputted data is then selected from among the classes contained in the discriminated category.

In either case, however, a single neural network is used in selecting the target class.

Each of the neural networks generally has a learning algorithm whereby the operation for modifying various internal connection factors (weights) is repeated in accordance with given learning data so that the internal weights may be automatically converged into respective values appropriate for discriminating the learning data. This learning algorithm is applicable to the recognizing apparatus. In such a case, the recognizing apparatus learns to discriminate a class to which given learning data belongs from among all the classes to be discriminated. As a result, the learned neural network outputs a class to which an inputted data belongs in accordance with weights set in the learning.

There exist various learning algorithms such as Back-propagation network, Learning Vector Quantization (LVQ2) etc. However, each of the various learning algorithms has advantages and disadvantages. Accordingly, the most appropriate neural network must be selected so that the learning algorithm or discriminating algorithm contained therein may be suited for the contents of the class to be discriminated. If the appropriate neural network is not used, the learning or recognition is disadvantageously lowered in efficiency, or the recognition performance is lowered.

SUMMARY OF THE INVENTION

Accordingly, the present invention has been developed to substantially eliminate the above-described disadvantage inherent in the conventional recognizing apparatus, and has as its essential object to provide an improved recognizing apparatus in which the most appropriate neural network is selectively used in accordance with a class to be discriminated.

Another important object of the present invention is to provide a recognizing apparatus of the above described type having improved learning efficiency and recognizing efficiency.

In accomplishing these and other objects, a recognizing apparatus according to one preferred embodiment of the present invention can recognize a class to which an inputted characteristic pattern belongs from among a plurality of classes to be discriminated with the use of the most appropriate neural network. The classes are further classified into a plurality of categories.

The recognizing apparatus includes network selecting means for selecting a category to which the inputted characteristic pattern belongs and for selecting a neural network to be used in discriminating the class to which the inputted characteristic pattern belongs in the selected category, and network memory means for storing therein structures of a plurality of neural networks which have finished learning for respective categories, weights of the neural networks set by the learning and a plurality of discriminating algorithms to be used when the classes are discriminated by the neural networks.

The apparatus further includes network setting means for setting the structure and weights of a neural network selected by the network selecting means and a discriminating algorithm appropriate to the selected category, and details discriminating means for recognizing the class to which the inputted characteristic pattern belongs by performing the details discriminating operation using the neural network set by the neural network setting means.

When a certain characteristic pattern is inputted into the network selecting means, a category to which the characteristic pattern belongs is selected and a learned neural network having the discriminating characteristic most appropriate to the contents of the selected category is also selected. The network setting means then sets the structure of the neural network selected by the network selecting means and the weights set by the learning. The network setting means further sets a discriminating algorithm which is appropriate to the contents of the selected category and is used when a class to which the inputted characteristic pattern belongs is discriminated by the neural network. The structure of the selected neural network, the weights and the discriminating algorithm are read out of the network memory means. Thereafter, the details discriminating operation is carried out in accordance with the network structure set by the neural network setting means so that the category to which the inputted characteristic pattern belongs may be recognized. Accordingly, when the class to which the inputted characteristic pattern belongs is discriminated from among a plurality of classes contained in the same category, the discrimination can be done using the neural network having the discriminating characteristic most appropriate to the contents of such classes.

BRIEF DESCRIPTION OF THE DRAWINGS

These and other objects and features of the present invention will become more apparent from the following description taken in conjunction with the preferred embodiment thereof with reference to the accompanying drawings, throughout which like parts are designated by like reference numerals, and wherein:

FIG. 4 is a diagram indicative of one example of a Japanese kana character recognizing process according to the present invention.

DETAILED DESCRIPTION OF THE PREFERRED EMBODIMENTS

Figure 1:
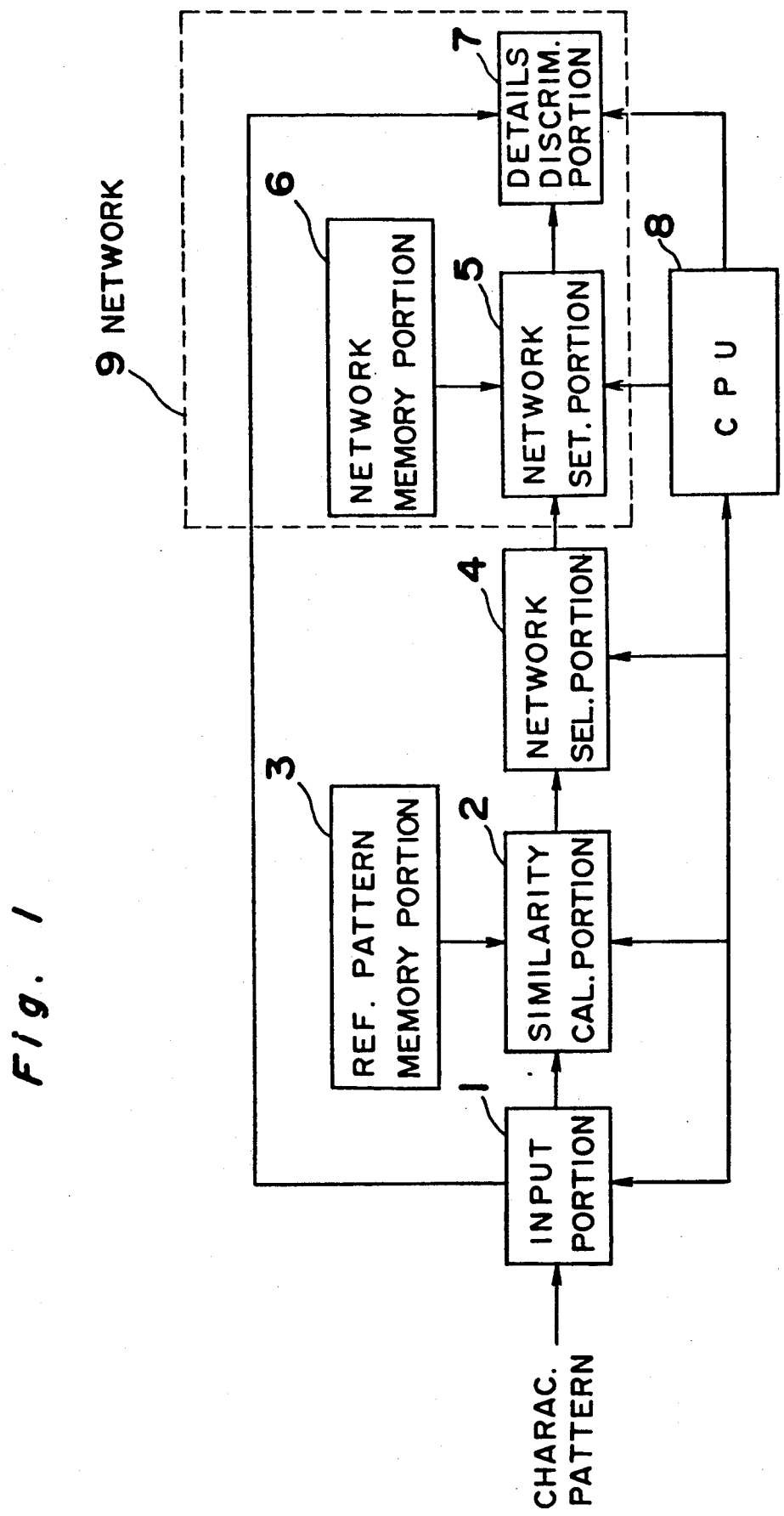
FIG. 1 is a block diagram of recognizing apparatus according to one preferred embodiment of the present invention.

Referring now to the drawings, there is illustrated in FIG. 1 a block diagram of a character recognizing apparatus according to one preferred embodiment of the present invention. In the character recognizing apparatus, a characteristic pattern picked up by a characteristic pickup portion (not shown) is initially inputted into a similarity calculating portion 2 through an input portion 1. In the similarity calculating portion 2, the degree of similarity is calculated relative to reference patterns, which are stored in advance in a reference pattern memory portion 3 according to classes to be discriminated. One example of the characteristic patterns or the reference patterns is a mesh characteristic pattern in which a character is divided into 8×8 latticed portions. The image density in each portion is treated as an index indicative of its characteristic.

A network selecting portion 4 classifies the inputted characteristic pattern by selecting a category, to which the characteristic pattern belongs, from among a plurality of categories on the basis of the similarity calculation result obtained by the similarity calculating portion 2. The network selecting portion 4 then selects the most appropriate neural network based on the selected category. It is noted that all characteristic patterns to be inputted through the input portion 1 can be classified into a plurality of classes, each of which is further classified in advance into either one of the categories according to the characteristic thereof. It is further noted that all the categories are made to correspond to respective neural networks appropriate to the characteristic of the contents thereof. Accordingly, the selection of one category results in the selection of one neural network having the discriminating characteristic appropriate to the characteristic of the classes contained in the category.

A network setting portion 5 selects and sets the structure of the selected neural network, the weights and a recognizing algorithm, which are stored in a network memory portion 6 according to the categories. In this way, the neural network having the optimum structure is set for details discrimination in which a class to which the inputted characteristic pattern belongs is discriminated from among a plurality of classes contained in the same category. The neural network is made to learn to discriminate each class in the category in advance. During the learning, the weights and the discriminating algorithm ar set in the neural network.

A details discriminating portion 7 receives the characteristic pattern inputted through the input portion 1 and carries out the details discriminating operation on the basis of the network structure, the weights and the discriminating algorithm set in the network setting portion 5. The discrimination results obtained are sent to an external apparatus through an I/O portion (not shown). A CPU 8 carries out the character recognizing operation by controlling the input portion 1, the similarity calculating portion 2, the reference pattern memory portion 3, the network selecting portion 4, the network setting portion 5, the network memory portion 6 and the details discriminating portion 7

As illustrated in FIG. 1, a neural network 9 for carrying out the details discriminating operation includes the network setting portion 5, the network memory portion 6 and the details discriminating portion 7. This neural network 9 does not have a specified structure in advance but the structure is determined in a manner as described above, in which the network structure, the weights and the discriminating algorithm stored in the network memory portion 6 are selectively set by the network setting portion 5.

The one-character recognizing operation to be carried out by the CPU 8 will be discussed in detail hereinafter with reference to a flow-chart of FIG. 2.

The similarity calculation is initially carried out at step s1 between a characteristic pattern inputted through the input portion 1 and reference patterns stored in the reference pattern memory portion 3. The classification is then carried out for selecting a category, to which the inputted characteristic pattern belongs, on the basis of the calculation result.

At step s2, a number (i) ($1 \leq i \leq I$) is given to the category selected at step s1.

It is then judged at step s3 which number is the number (i). If the number (i) is "1", the procedure proceeds to step s4. If the number (i) is "2", the procedure proceeds to step s7. If the number (i) is "I", the procedure proceeds to step s10.

The neural network 1 is selected at step s4 in accordance with the number "1" of category set at step s2. The network structure, the weights and a discriminating algorithm corresponding to the neural network 1 are set at step s5 followed by step s6 at which the details discriminating operation is carried out by the neural network 1.

Likewise, the network structure, the weights and a discriminating algorithm corresponding to the neural network 2 or I are set at step s8 or s11, respectively, and the details discriminating operation is carried out by the neural network 2 or I at step s9 or s12.

In this way, the category to which the inputted characteristic pattern belongs is discriminated and the one-character recognizing operation is terminated.

Figure 2:
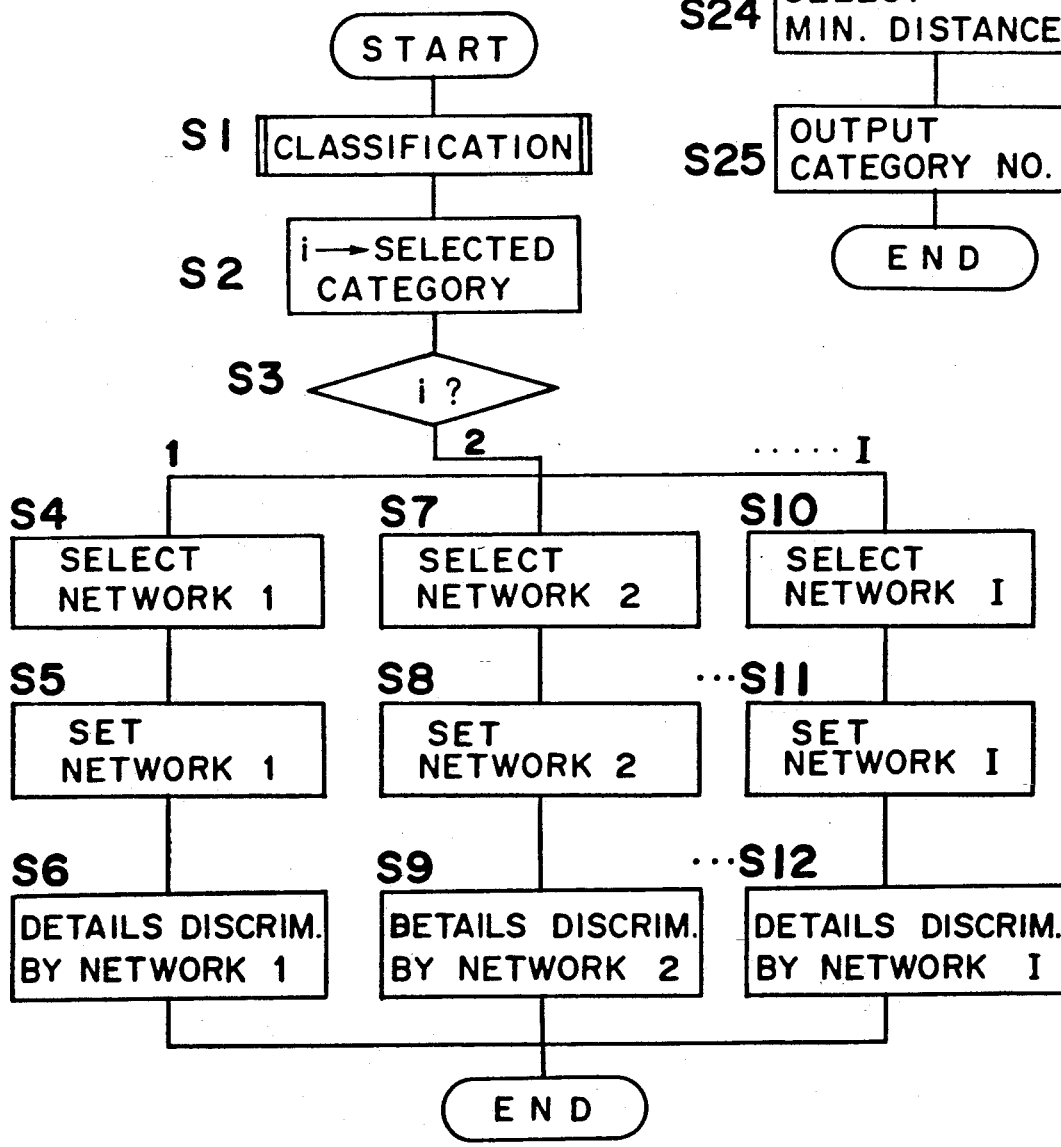
FIG. 2 is a flow-chart indicative of the one-character recognizing operation to be carried out in a CPU as illustrated in the block diagram of FIG. 1.
Figure 3:
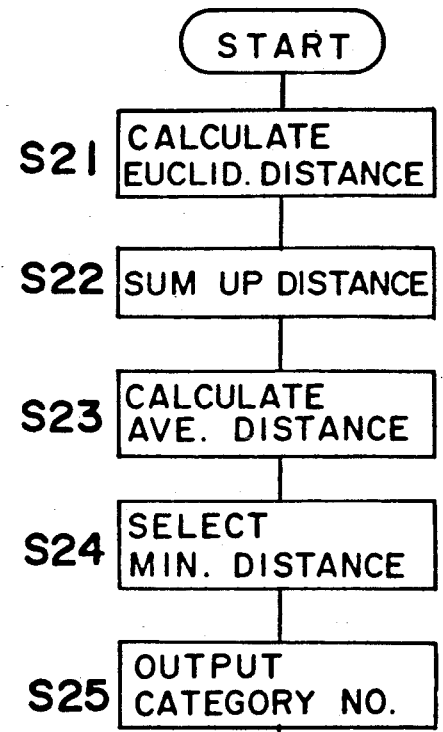
FIG. 3 is a flow-chart indicative of a classification routine in the flow-chart of FIG. 2.

FIG. 3 depicts a flow-chart indicative of a classification routine carried out at step s1 in the flowchart of FIG. 2.

The Euclidean distance is calculated at step s21 between the characteristic pattern inputted through the input portion 1 and each of the reference patterns stored in the reference pattern memory portion 3. The Euclidean distance calculated at step s21 is summed up for every category at step s22 followed by step s23 at which the average distance in each category is calculated on the basis of the total Euclidean distance. Thereafter, the minimum average distance is selected at step s24 from among the average distances in all the categories. At step s25, the number (i) of category is outputted which corresponds to the minimum average distance selected at step s24. In this way, the classification routine is terminated.

The character recognizing operation will be further discussed with reference to FIG. 4(a), which indicates the process for recognizing Japanese kana characters "か" and "ば". FIGS. 4(a), (b), (c), (d) and (e) represent inputted characters, categories to which the inputted characters belong, learning algorithms corresponding to the categories, neural networks used in the details discriminating operation, and recognition results, respectively.

In this case, all the classes to be discriminated are "か", "が", "ち", "ば", "ぱ" and "ぽ". As described above, the learning algorithms for the neural networks include Backpropagation and LVQ2. The learning by Backpropagation is relatively time-consuming. However, a neural network learned by Backpropagation is advantageous in that the network can discriminate the difference between details of a characteristic pattern and details of a reference pattern on an enlarged scale. In contrast, a neural network learned by LVQ2 cannot discriminate the difference of the details of the characteristic pattern. LVQ2, however, has an advantage over Backpropagation in that the LVQ2 requires less time for the learning than Backpropagation. Accordingly, the classification of all the classes into the categories is carried out in advance in accordance with the configuration of the Japanese kana characters. More specifically, the category having the number "1" includes the classes and "ぁ", "ぇ", and "ち", all of which differ from one another to some extent on the whole whereas the category having the number "2" includes the classes "ぃぁ", "ぃぇ" and "ぃち", all of which have specific portions different from one another in configuration.

If a characteristic pattern indicative of the Japanese kana character "ぁ" is inputted into the input portion 1, the classification is carried out at step s1 as follows.

At steps 21-25 in the flow-chart of FIG. 3, the Euclidean distance between the characteristic pattern "ぁ" and each of the reference patterns "ぁ", "ぇ", "ち", "ぃぁ", "ぃぇ" and "ぃち" is calculated. Subsequently, the average value of the distance with respect to "ぁ", "ぇ" and "ち" and the average value of the distance with respect to and "ぃぁ", "ぃぇ" and "ぃち" are calculated. Both the average values are then compared with each other for selection of the minimum average distance. In this case, the average distance of the category having the number "1" and including the classes "ぁ", "ぇ" and "ち" is selected and the number "1" of the category is outputted.

At steps s2-s4 in the flow-chart of FIG. 2, the outputted number "1" selects the neural network "1". The network structure, the weights and the algorithm corresponding to the neural network "1" are set at step s5.

As described above, the neural network learned by Backpropagation can discriminate the difference of details of characteristic patterns on an enlarged scale whereas the neural network learned by LVQ2 can discriminate the difference of the whole configurations of the characteristic patterns. Accordingly, since the classes contained in the category "1" differ in the whole configuration from one another, the neural network learned by LVQ2 is assigned to the category "1". The neural network is then made to learn to classify the classes "ぁ", "ぇ" and "ち" contained in the category "1" by using LVQ2. The weights set during the learning and the network structure used in the learning are stored in the network memory portion 6 so as to correspond to the category "1". In this case, the network used in the learning is well known as Kohonen type neural network. As a result, the network structure and the weights appropriate to the category "1" are set at step s5 in the flow-chart of FIG. 2.

At subsequent step s6, the characteristic pattern "ぁ" is inputted into an input node of the Kohonen type neural network, and the details discriminating operation is carried out by the discriminating algorithm of the Kohonen type neural network using the weights set at step s5. Thereafter, the recognition result "ぁ" is outputted. Since the learning operation and the details discriminating operation by the Kohonen type neural network can be carried out within a relatively short period of time, the process for recognizing "ぁ" is effectively carried out. Furthermore, since the classes contained in the category "1" does not have specific portions different from one another but differ in the whole configuration, "ぁ" can be correctly recognized even by the Kohonen type neural network learned by LVQ2.

On the other hand, if a characteristic pattern "ぃぁ" is inputted, the classification is carried out in the same manner as above. More specifically, the calculation is performed for obtaining the average value of the distance with respect to "ぁ", "ぇ" and "ち" the average value of the distance with respect to "ぃぁ", "ぃぇ" and "ぃち". The minimum average distance (in this case, the average distance of the category including the classes "ぃぁ", "ぃぇ" and "ぃち") is then selected and the number "2" of category is outputted, thus resulting in the selection of the neural network "2". In this case, the neural network learned by Backpropagation is selected so as to correspond to the category 2 in which the classes are relatively similar on the whole but have specific portions different in configuration from one another. As a result, the weights set in advance by Backpropagation in the learning for classifying the classes "ぃぁ", "ぃぇ" and "ぃち" and the network structure used in the learning are selected. In this case, the network used in the learning is well known as Perceptron type neural network.

The characteristic pattern "ぃぁ" is then inputted into an input unit of the Perceptron type neural network. The details discriminating operation is carried out by the discriminating algorithm of the Perceptron type neural network using the weights set already. The difference of the details of the characteristic pattern "ぃぁ" is then enlarged and correctly discriminated. Thereafter, the recognition result "ぃぁ" is outputted. In this way, the class to which the characteristic pattern belongs is correctly distinguished from other classes to which characteristic patterns analogous to the inputted characteristic pattern belong.

As described above, in the recognizing apparatus according to the present invention, all the classes to be discriminated are classified into a plurality of categories in advance. A category to which an inputted characteristic pattern belongs is initially selected. A class to which the inputted characteristic pattern belongs is subsequently recognized from among a plurality of classes contained in the selected category using a learned neural network having a discriminating algorithm most appropriate to the contents of the classes contained in the selected category. Accordingly, the class to which the inputted characteristic pattern belongs can be effectively recognized with high accuracy.

The recognizing apparatus according to the present invention makes good use of the advantages of various neural networks. Kohonen type neural network, which is relatively quick in recognizing operation, is used for performing the details discriminating operation with respect to a category containing classes which are different from one another in the whole configuration. On the other hand, Perceptron type neural network which can correctly recognize the difference of details is used for performing the details discriminating operation with respect to a category containing classes which have specific portions different in configuration from one another.

It is noted that in the above-described embodiment, although the classification routine for selecting the category to which the inputted characteristic pattern belongs is carried out by the similarity calculation, this routine may be carried out using neural networks.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. A recognizing apparatus for recognizing a class to which an inputted characteristic pattern belongs from among a plurality of classes to be discriminated by using one of a plurality of neural networks with said classes being classified into a plurality of categories, said recognizing apparatus comprising:

network selecting means for selecting one of said plurality of categories to which the inputted characteristic pattern belongs by comparing the inputted characteristic pattern with a plurality of reference patterns and for selecting one of said plurality of neural networks for use in discriminating one of the classes to which the inputted characteristic pattern belongs in said one category;

network memory means for storing therein structures of said plurality of neural networks which have finished learning for respective categories, weights of said neural networks set by the learning and a plurality of discriminating algorithms to be used when the classes are discriminated by said neural networks;

network setting means for setting said structure and said weights of said one neural network selected by said network selecting means and one of said discriminating algorithms corresponding to said one category to create an optimized neural network; and details discriminating means for recognizing said one class to which the inputted characteristic pattern belongs by performing a details discriminating operation by using said optimized neural network set by said neural network setting means.

2. The recognizing apparatus according to claim 1, further comprising reference pattern memory means for storing therein said plurality of reference patterns corresponding to said plurality of categories and similarity calculating means for calculating the degree of similarity between the inputted characteristic pattern and the reference patterns.

3. The recognizing apparatus according to claim 1, wherein said plurality of neural networks comprise a Kohonen type neural network and a Perceptron type neural network.

4. The recognizing apparatus according to claim 1, wherein said structure, said weights and said discriminating algorithms of said one neural network are learned by one of a plurality of learning algorithms.

5. The recognizing apparatus according to claim 4 wherein said plurality of learning algorithms comprise Backpropagation and LVQ2 algorithms.

6. A method for recognizing a class to which an inputted characteristic pattern belongs from among a plurality of classes to be discriminated by using one of a plurality of neural networks with said classes being classified into a plurality of categories, comprising the steps of:

(a) comparing the inputted characteristic pattern with a plurality of reference patterns;

(b) selecting one of said plurality of categories and one of said plurality of neural networks for use in discriminating one of the classes to which the inputted characteristic pattern belongs in said one category;

(c) storing structures of said plurality of neural networks which have finished learning for respective categories, weights of said neural networks set by the learning and a plurality of discriminating algorithms to be used when the classes are discriminated by said neural networks;

(d) setting said structure and said weights of said one neural network selected at said step (b) and one of said discriminating algorithms appropriate to said one category to create an optimized neural network; and (e) recognizing said one class to which the inputted characteristic pattern belongs by performing a details discriminating operation by using said optimized neural network set at said step (d).

* * * * *